March 3, 1970     R. W. HILTON ET AL     3,498,221
ALUMINUM CARTRIDGE CASE

Filed July 11, 1968                                                        5 Sheets-Sheet 1

INVENTORS.
RALPH W. HILTON
BY GILBERT A. MOUDRY

Donald E. Townsend
ATTORNEY

INVENTORS.
RALPH W. HILTON
BY GILBERT A. MOUDRY

Donald C. Townsend
ATTORNEY

March 3, 1970  R. W. HILTON ET AL  3,498,221
ALUMINUM CARTRIDGE CASE

Filed July 11, 1968  5 Sheets-Sheet 5

INVENTORS.
RALPH W. HILTON
GILBERT A. MOUDRY
BY
Donald E. Townsend
ATTORNEY

Patented Mar. 3, 1970

3,498,221
ALUMINUM CARTRIDGE CASE

Ralph W. Hilton, Torrance, and Gilbert A. Moudry, Palos Verdes Estates, Calif., assignors to Harvey Aluminum (Incorporated), Torrance, Calif., a corporation of California
Filed July 11, 1968, Ser. No. 744,182
Int. Cl. F42b 5/28, 9/28
U.S. Cl. 102—43                               19 Claims

ABSTRACT OF THE DISCLOSURE

A high-strength cartridge case made of an Al-Cu-Mg-Si type alloy is fabricated by backwardly extruding a deep drawn cylindrical blank into a cup-shaped member with a resultant movement in the metal blank of at least about 70%, the walls of the cup-shaped member are thinned and elongated by drawing the same through a die aperture of reduced diameter to effect a total metal movement in the original blank of at least about 90%, the resultant drawn member is solution heat treated and quenched in cold water to strengthen the metal, and a primer cavity is then forged in the base portion of the member to impart thereto at least about 15% cold work.

---

With the range and fire power of any given military aircraft being dependent to a considerable extent upon the weight of the ammunition being delivered to the target, it is extremely important to reduce as much as possible the weight of the individual ammunition round. Such light weight rounds are likewise valuable to the infantrymen who must, in most instances, carry his own ammunition supply to the combat area. For these reasons, it is important to reduce the weight of the individual round and maximize the fire power per unit weight of ammunition delivered to the target area.

In this connection, it has been proposed to fabricate cartridge cases from a light weight aluminum alloy containing not over about ½% silicon, up to 8% copper, and up to 12% of magnesium (see U.S. Patent No. 1,510,590). During the fabrication of a cartridge case from such aluminum alloys, it is necessary to employ a relatively large number of separate shaping steps, care being taken to stress relieve the metal by annealing between many of the separate shaping steps. Even with a relatively large number of incremental steps being used to shape the metal, cartridge cases produced in this manner are unreliable and often crack or rupture in the barrel when fired. Where such cartridge cases are loaded with a more powerful military charge, it is often necessary to reinforce the base of the case with a cup or ring of a harder material such as steel or bronze.

It has previously been suggested to fabricate an aluminum cartridge case having continuous metal flow lines which extend along the sidewalls and turn in the shape of an S inwardly within the base portion of the case (see U.S. Patent No. 2,349,970). Although a cartridge case with such a continuous flow pattern appears desirable, it has been found that such cases often lack the needed strength in the base portion. As a consequence, the metal partiton separating the primer cavity from the interior of the shell often expands or dishes outwardly during firing which in turn expands the primer cavity and allows the escape of gases from the rear of the case.

It is therefore a principal object of the invention to provide an improved light weight aluminum cartridge case suitable for use in both sporting and military applications.

Another object is to provide an improved and reliable aluminum cartridge case which can be manufactured with ease in production lots.

Yet another object is to provide an aluminum cartridge case fabricated in such a manner that the metal flow lines reinforce and strengthen the base portion of the case.

Still another object is to provide suitable aluminum alloys from which the improved cartridge case can be fabricated.

These and other objects and advantages of the invention will become apparent by reference to the following description, drawings, and claims appended hereto.

To attain the foregoing objects, a high strength cartridge case can be fabricated from an Al-Cu-Mg-Si type alloy by first backwardly extruding a solid cylindrical blank into a cup-shaped member followed by drawing to thin and elongate the walls thereof. It was surprisingly discovered that by using a blank of an aluminum alloy described hereinafter, at least about 90% of the metal in the original blank can be moved in the foregoing two operations and at least about 70% of the metal can be moved in the first extrusion operation. Many of the previously required metal working steps can thus be eliminated and it is now possible to successfully fabricate an aluminum cartridge case using less than half of the operations heretofore required.

A number of attempts have been made to fabricate a cartridge case from an Al-Cu-Mg-Si type alloy containing a maximum of about 0.5% silicon. Such cartridge cases, however, develop splits or cracks during either fabrication or firing, and cartridge cases made of such alloys are unsatifactory in most instances due to their low strength and brittleness. It was, therefore, unexpected to discover that a high strength cartridge case having the desired ductility can be fabricated from an Al-Cu-Mg-Si type alloy when the silicon content thereof is at least about 0.9% by weight. Advantageously, a sufficient amount of silicon is used to react or combine with the magnesium to form the intermetallic compound $Mg_2Si$. Billets containing a relatively high concentration of silicon, above about 2.7% by weight, are difficult to form and it is therefore preferred to employ no more than about 2.2% by weight of silicon.

It has also been found that splitting and cracking of the case occurs during fabrication when any substantial amount of magnesium is present in a free and uncombined form. When substantially all of the magnesium is present as the intermetallic compound $Mg_2Si$ in a precipitated form uniformly distributed in the alloy matrix, the alloy possesses satisfactory mechanical properties to be worked by the process herein. It is therefore preferred to employ in the alloy about a 10 mole percent excess of silicon over and above the stoichiometric amount needed to react with the magnesium, thereby insuring that all magnesium present is combined in the form of the intermetallic compound $Mg_2Si$.

The incorporation of copper into the alloy also has been found to be important in providing the needed high strength, it being preferred to employ at least about 0.9% by weight of copper. In most cases, it is preferred to incorporate into the alloy a sufficient amount of copper to form from about 1.5 to 4.2% by weight of the intermetallic compound $CuAl_2$. When the copper is present in the form of $CuAl_2$, the alloy possesses the requisite strength without exhibiting undue brittleness which hampers fabrication.

Although the aluminum alloy composition can be varied to satisfy the requirements of strength and ductility for any given caliber of cartridge case, it is preferable to employ for cartridges cases with calibers of from about 5 to 106 mm. an aluminum alloy containing from about 0.9 to 2.2, more preferably from about 1.2 to 2.0% by weight silicon; from about 0.6 to 1.5, more preferably from about 0.85 to 1.0% by weight magnesium; and from about 9.0 to 2.1, more preferably from about 1.2 to 1.8% by weight copper.

A particularly satisfactory aluminum alloy for use herein comprises, in percent by weight, about 1.5% silicon, 1.6% copper and 0.9% magnesium. As in the case of most of the conventional aluminum alloys trace amounts of iron, chromium, nickel, zinc, titanium, and other common trace impurities can be present in the alloys.

The invention is illustrated further in several typically preferred embodiments in the accompanying drawings in which.

Figure 1:
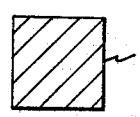
FIG. 1 is a sectional view of a solid metal blank from which the cartridge case of the present invention is fabricated.
Figure 2:
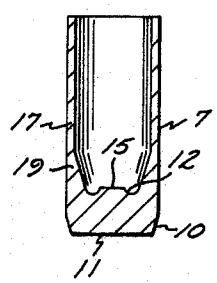
FIGS. 2 to 5 are cross-sectional views of some of the intermediate shapes formed from the metal blank.
Figure 3:
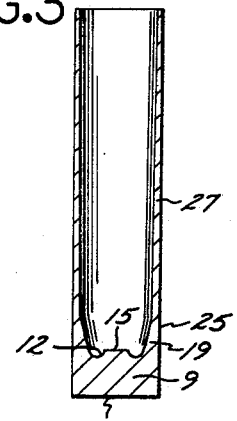

Referring now to the drawings, the cylindrical blank indicated generally at 1 in FIG. 1 is backwardly extruded into a cup-shaped member 7 (FIG. 2). The blank 1 which is sized to fit snugly into an extrusion die cavity is cut to length from an extruded rod which has preferably been deep drawn to effect an elongation thereof to at least about 15%. The cup-shaped member 7 comprises a base portion 9 having a boss 15 on its inner surface 12 with a bevelled sidewall 10 adjacent the circular end surface 11, and cylindrical sidewalls 17 with a thickened portion 19 adjacent the base portion. By drawing member 7 through a die aperture having a reduced diameter, an elongated cup-like member 25 is produced with relatively thin cylindrical walls 27 such as shown in FIG. 3. Before any further shaping, excess metal is preferably removed from the open end of member 25 by trimming off the end, the case then being solution heat treated and quenched in cold water to metallurgically strengthen the case.

Figure 4:
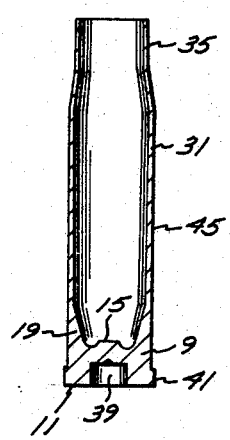
Figure 5:
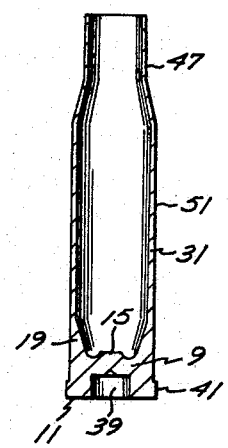

Thereafter, in a combined operation, the walls 27 of member 25 are tapered as at 31, the open end is sunk to form neck 35 having a reduced diameter, a primer cavity 39 is forged in the end surface 11 of base portion 9, and an outwardly projecting flange 41 is formed on the sidewall at the end of the base portion, the resultant shaped member 45 being depicted in FIG. 4. Another separate sinking operation can then be carried out on member 45 to form a smaller neck 47 having a contour as shown in FIG. 5, the finally necked member 51 then being machined to form groove 55 in the base portion 9 and a central bore 59 extending from primer cavity 39 through boss 15 into the interior of the completed cartridge case 61, as shown in FIG. 6.

When metal is deformed or worked in order to form, for example, the cartridge case 61, the grains of metal are established along the lines of flow which are oriented in the direction of working. These flow lines are sometimes sufficiently distinct as to be visible to the eye, although they are most often made visible by etching a cross-section. To better illustrate the cartridge case 61 of the present invention, the flow line pattern thereof is compared with the flow line pattern of cartridge cases produced by conventional methods.

Figure 6:
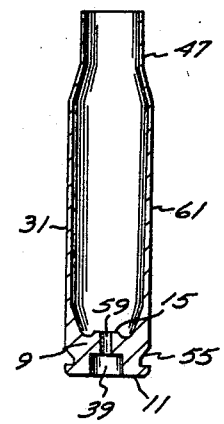
FIG. 6 is a sectional view of a cartridge case fabricated according to the present invention.
Figure 7:
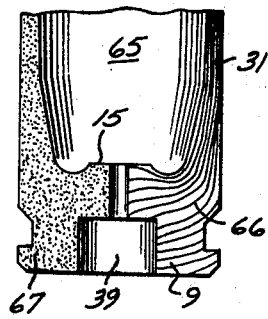
FIGS. 7 and 8 are fragmentary sectional views of several cartridge cases produced according to the prior art, each of these views showing a conventional pattern of metal flow lines in the end portion of the case.

The prior art cartridge case 65 illustrated in FIG. 7, and having the same reference numerals indicated in FIG. 6, is made by the conventional methods of cupping and drawing rolled stock. Starting with a rolled plate having a substantially uni-directional grain orientation lying in the direction of rolling, the case 65 is produced with only a portion of the flow lines of the metal extending along the cross-section of the case parallel to the longitudinal axis, such as the flow lines 66 on the right side of case 65 in FIG. 7. The remaining flow lines are transverse to the longitudinal axis of the case and lie normal to the cross-section thereof, the ends 67 of these flow lines being illustrated as on the left side of FIG. 7. Cartridge cases lacking bilateral symmetry in the metal flow lines are unreliable in many instances due to the variation in strength and ductility of the case.

Figure 8:
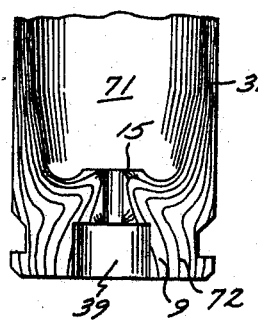

FIG. 8 illustrates yet another conventional cartridge case 71, made by extruding a slug having a central aperture therein. Although the flow lines 72 are bilaterally symmetrical, only a relatively few flow lines can be seen in the boss area of the head where high strength is needed. Without a relatively high concentration of such flow lines in the head area, deformation and/or dishing of the boss area of the base can occur during firing.

Figure 9:
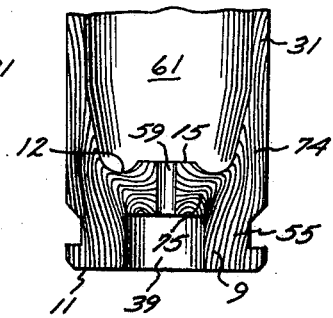
FIG. 9 is a fragmentary sectional view showing the metal flow lines in the end portion of a cartridge case produced according to the present invention.

By carrying out the manufacture of a cartridge case according to the methods of the present invention described hereinafter, the metal flow lines are bilaterally symmetrical and concentrated in the base portion as shown in FIG. 9. In this cartridge case 61, the metal flow lines extend to and terminate at the end surface 11 of base portion 9, one set of flow lines 74 extending parallel to the longitudinal axis of the case from end surface 11 and along sidewall 31, another set of flow lines 75 extending in a curved pattern from the surface 12 of boss 15 and central bore 59 to the end surface 11 of the base. To provide the needed strength in the base portion 9, a majority of the flow lines 75 follow the contour of the walls of primer cavity 39.

Satisfactory reinforcement of the base portion 9 between the primer cavity 39 and the interior of the case can be achieved by having a boss 15 formed on the inner surface 12 of the base as shown in FIGS. 6 and 9. Dishing of the base, even with such a boss, can occur unless the boss is of sufficient size and strength to provide the needed reinforcement of the base 9 to use a volume of metal in forming the boss which is at least about equal to the volume of the central bore 59. Although the size of central bore 59 varies with the caliber of the cartridge case, it was found that dishing of the base was prevented by having a boss on inner surface 12 with at least that volume of metal which is removed from the base in forming central bore 59.

In repeated firing tests with 7.62 caliber cartridge cases of the present invention, using both civilian primers as well as more powerful military primers, no more than the normal deformation of the metal occurred in the head area and dishing of the head which is so prevalent in prior art cases was eliminated. Without the advantageous metal flow lines as shown in FIG. 9, the splitting and cracking of the case occurs and, in such instances, the case becomes jammed in the barrel and often cannot be ejected.

Figure 10:
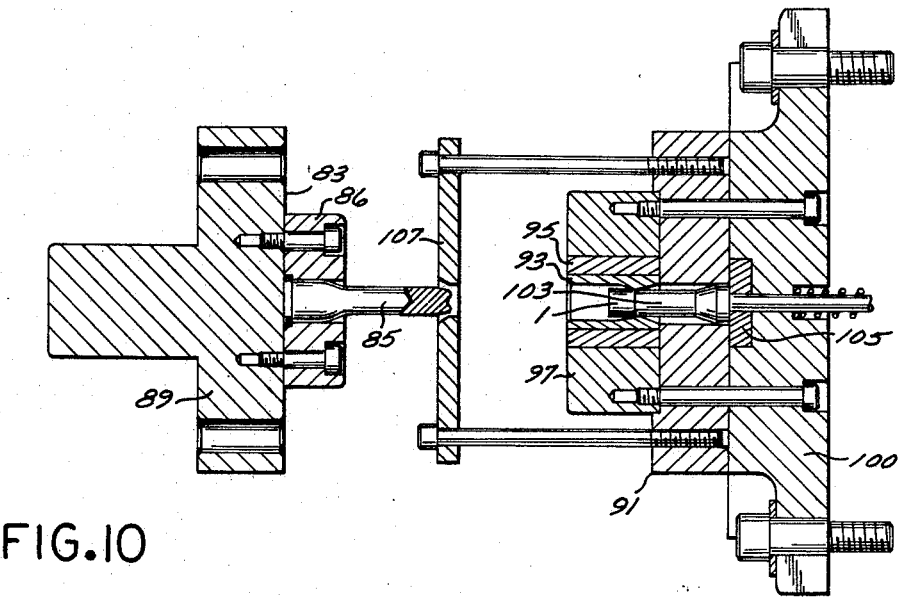
FIGS. 10 and 11 are side elevational views partly in cross-section of apparatus for backwardly extruding a cup-shaped member from a solid blank.
Figure 11:
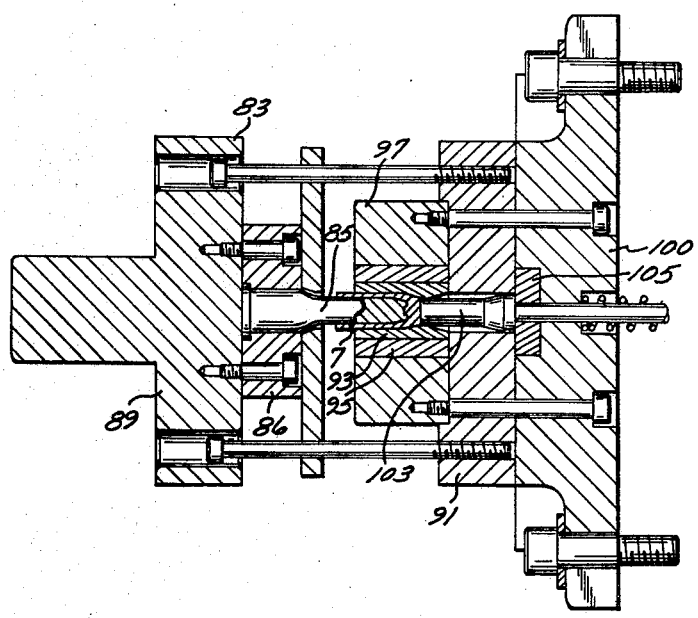

Fabrication of the cup-shaped member 7 can be carried out in a die set such as shown in FIG. 10 which comprises a punch assembly indicated generally at 83 and a die assembly 91. A die insert 93 in which blank 1 rests is held securely in die retainer 97 by means of armor ring 95. These stacked die members are held securely on a lower die shoe 100 which is preferably provided with a reciprocating spring-loaded lower punch 103 to hold the blank positioned in die 93. Also mounted on lower die shoe 100 is a hard plate 105 to eliminate brinelling of the lower die shoe, and a stripper 107 for removal of the resultant cup-shaped member 7 from extrusion punch 85 which is secured to upper die shoe 89 by punch holder 86. In this first shaping operation, the head of punch 85 moves through an aperture in the stripper 107 into contact with blank 1, the blank being backwardly extruded and flowing in the annulus between the cavity in die 93 and the surface of the punch as shown in FIG. 11. According to the present invention, at least about 70% of the metal in blank 1 is moved in this backward extrusion to form the resultant cup-shaped member 7 (FIG. 2).

Removal of cold work stresses in member 7 resulting from the extrusion can be effected in a partial annealing step by heating to from about 600 to 725° F. for from about ¼ to ½ hour. Advantageously, the cup-shaped member 7 is lubricated before elongation with a conventional lubricant such as a drawing compound.

Figure 12:
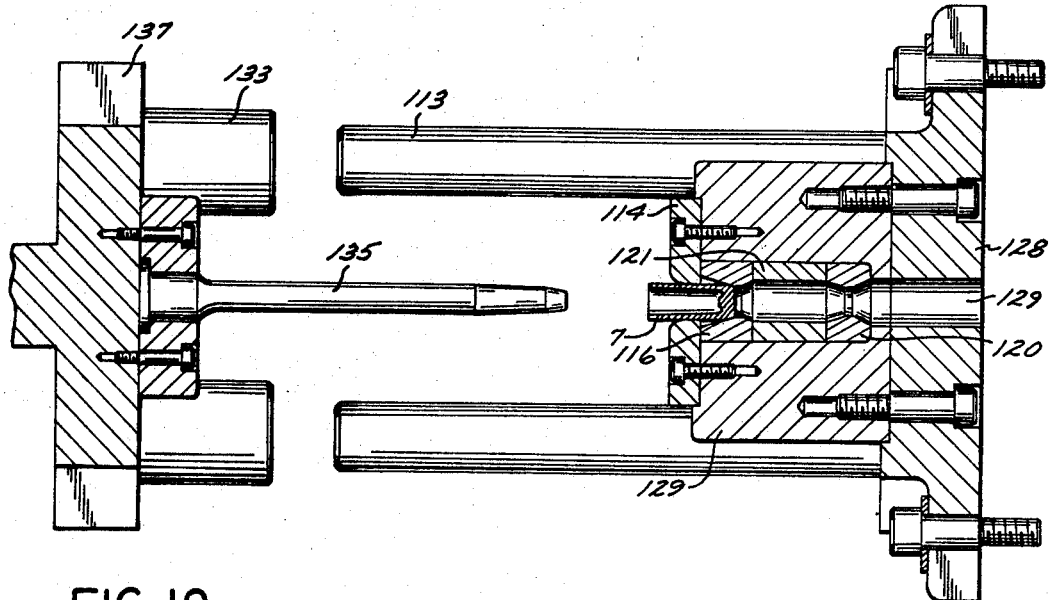
FIGS. 12 and 13 are side elevational views partly in cross-section of apparatus for drawing the sidewalls of the cup-shaped member.
Figure 13:
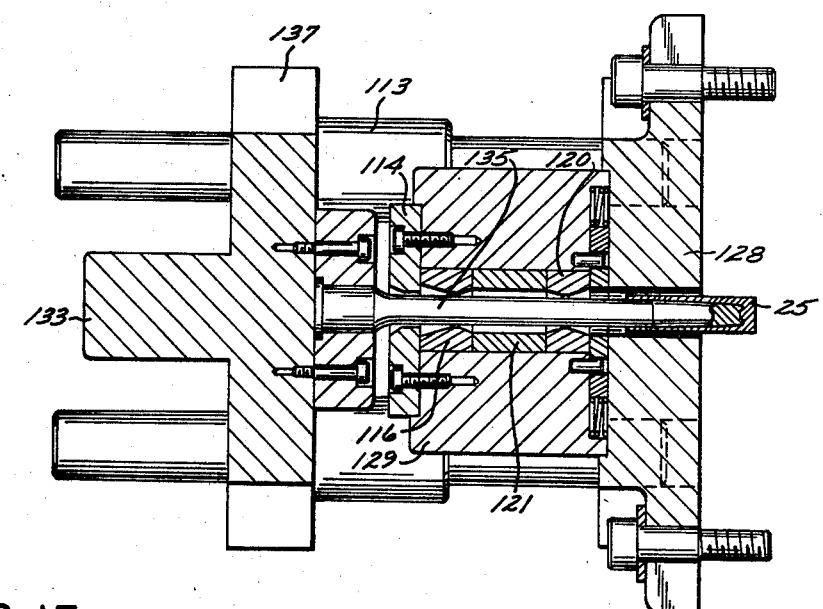

Drawing of member 7 to thin and elongate the sidewalls thereof can then be carried out in a draw punch assembly, such as shown in FIGS. 12 and 13, which comprise a die assembly 113 and a reciprocating punch assembly 133. The cup-shaped member 7 is first inserted into the aperture in the nest member 114 which hold a first and second die insert 116, 120, respectively. A die spacer 121 intermediate the die inserts hold them stationary in retainer member 129 which is affixed to lower die shoe 128.

In operation, the draw punch 135 affixed to upper die shoe 137 moves into the open end of the cup-shaped member 7 and forces it through the tandem die lands of the first and second dies 116, 127. As the sidewalls of member 7 are forced between the die lands and the surface of the punch, the yield point of the metal is exceeded and the sidewalls are permanently deformed. The resultant drawn member 25 then exits through aperture or hole 129 in die shoe 128 as shown in FIG. 13. According to the present invention, the above-described drawing step can be carried out using either one die or several tandem draw dies, it being preferred to effect in the drawing operation a total metal movement of the original blank 1 of at least about 90%. In most cases, the drawn member 25 has been elongated to a length slightly greater than desired to permit more accurate subsequent cutting of the member to the desired length.

After drawing, member 25 is then preferably solution heat treated to obtain the optimum metallurgical and mechanical properties. Although the conditions of the heat treatment can be varied to effect the desired mechanical properties of the metal, it is preferred to heat treat members fabricated from the above-described alloys at a temperature of from about 990 to 1015° F., and particularly at about 1000° F. for from about 10 minutes to 2 hours, more preferably from about 15 minutes to 1 hour.

Figure 14:
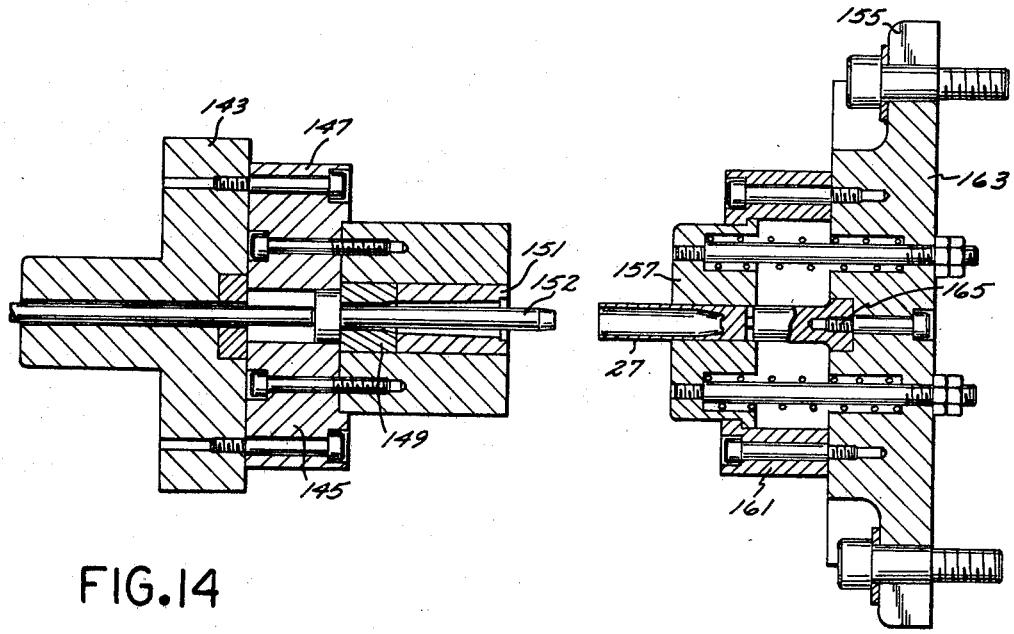
FIGS. 14 and 15 are side elevational views partly in cross-section of an apparatus for tapering and necking the sidewalls of the member as well as forging a primer cavity in the end portion thereof.

According to a preferred embodiment of the present invention, a combined shaping operation can then be carried out to head, taper, neck, and forge a primer cavity in the heat treated member 25. The punch and die assembly used in this operation and as shown in FIG. 14 comprises an upper die shoe 143 having connected thereto a die retainer 147 which holds neck die insert 149 with body die insert 151, and a movable heading punch 152. Member 25 is first inserted into and held by a die assembly indicated generally at 155 which comprises a nest 157, index ring 161, lower die shoe 163, and punch 165.

With the strength resulting from the previous cold work having been removed or neutralized by the solution heat treatment, it is desirable to increase the strength in the base portion of the case in the remaining shaping operation. This can be conveniently accomplished by forging a flange 41 together with a primer cavity 39 in the base portion of member 25. It has been found that a cartridge case with an exceedingly strong base portion can be produced by imparting to the base during the forging operation at least about 15% cold work, and preferably between about 15 and 22% cold work. Cartridge cases produced in this manner are found to be highly reliable and failures about the base portion and particularly in the primer pocket area have been eliminated.

Figure 15:
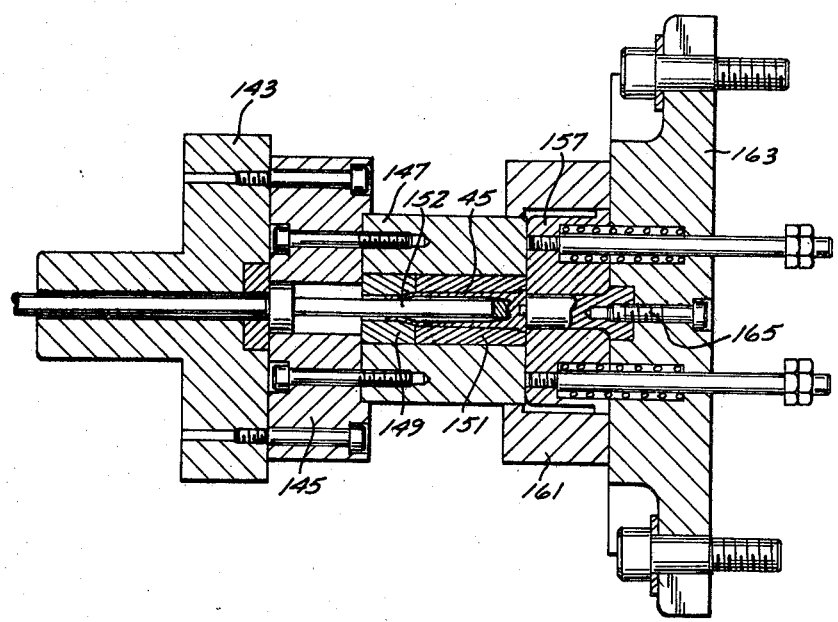

The combined operation is commenced by moving the inner surface of boss 15 into engagement with punch 152 and simultaneously forcing the sidewalls 27 of member 25 to assume the shape of dies 149 and 151. At the same time, punch 165 moves forward in lower die shoe 163 to form flange 41 on the base as well as primer cavity 139, thereby producing member 45 (FIG. 15). As can be seen, the sidewalls in contact with die 151 taper slightly and the end portion of the sidewalls are sunk considerably in die 149 to form neck 35 having a substantially reduced diameter.

The diameter of the primer cavity formed in the base of conventional brass cartridge cases is ordinarily from about 0.1 to 0.4% smaller than the diameter of the brass primer to be sunk therein. When a series of test firings were made using military brass primers in aluminum cartridge cases with these same tolerances, it was found that a substantial number of the rounds were defective in that the propellant gases escaped rearwardly from the primer cavity. It was unexpectedly discovered, however, that gas leaks around the primer could be completely eliminated by sizing the diameter of the primer cavity from about 1.0 to 1.5% smaller than the diameter of the primer to be sunk therein. By employing such a smaller size of primer cavity, it was found that conventional brass military primers are compatible with the aluminum cartridge case of the present invention.

The resultant forged member 45 is then preferably precipitation heat treated at a relatively low temperature of from about 310 to 350° F. for from about 10 to 24 hours to increase the hardness and strength thereof.

Figure 16:
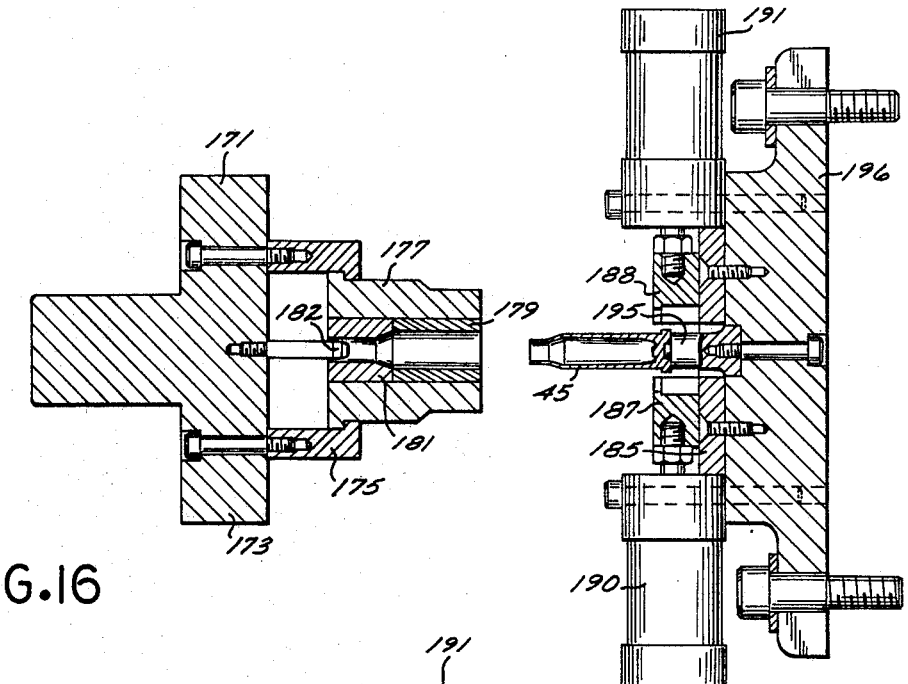
FIGS. 16 and 17 are side elevational views partly in cross-section of a sizing punch and necking die in which the final necking operation is carried out.
Figure 17:
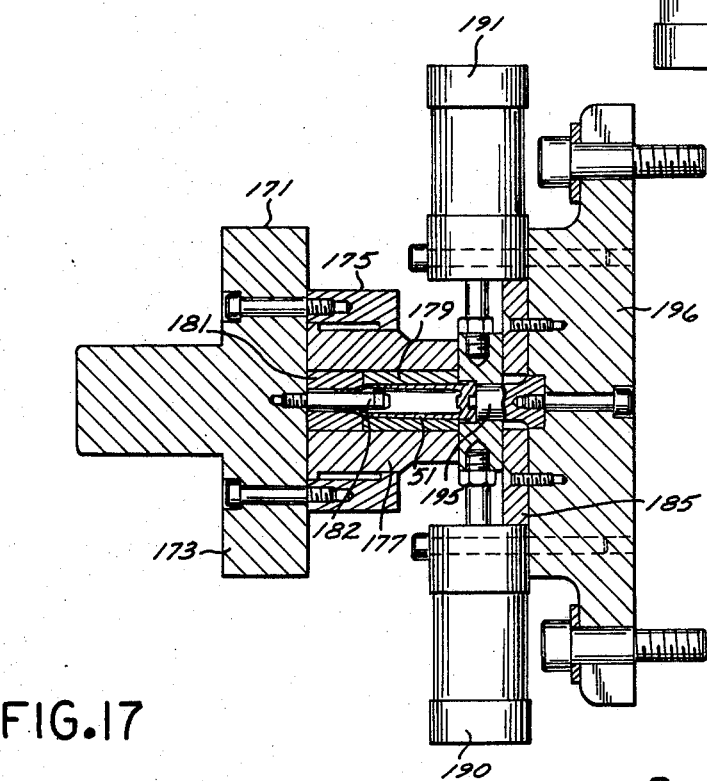

Thereafter, member 45 is subjected to a final necking operation in the apparatus shown in FIGS. 16 and 17 which includes a punch assembly 171 having an upper die shoe 173, index ring 175, die retainer 177, retaining die insert 179, final sizing and necking die 181, and a sizing punch 182. The forged member 45 is held against the head of lower punch 195 which is movable in lower die shoe 196 and nest 185. A pair of plates 187, 188 which are actuated by hydraulic cylinders 190, 191, respectively, or other mechanical means, hold member 45 securely against the head of the lower punch. As member 45 moves into the die cavity in dies 179, 181, punch 182 moves forward into the neck thereof to maintain the proper shape and thickness of the wall portion being sunk, the resultant finally necked member 51 being produced as in FIG. 17.

The cartridge cases produced heretofore by the various manufacturing techniques all require that the neck portion of the case be selectively annealed to soften the metal and facilitate flexing thereof during firing. As a result of this latter annealing step, the hardness of the case varies considerably between its ends. For example, most military specifications require a selective annealing of the neck so that the base portion of the cartridge case will be at least about 50% harder than the neck portion. It was therefore unexpected to find that a high strength and reliable cartridge case could be produced according to the present invention without such a selective annealing of the neck, and with no more than about an 8% variation in hardness the case would possess the required strength and ductility. Using the alloys and fabrication techniques of the present invention, a reliable cartridge case can be produced having a base portion which is about 5% harder than the sidewall portion.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What we claim is:

1. An elongated metal cartridge case formed from aluminum which comprises a base portion having a boss on its inner surface with a central bore passing through said boss, and a side wall portion, the flow lines extending to and terminating at the end surface of the base portion, one set of flow lines extending substantially parallel to the longitudinal axis of the case from the end surface and along the side wall portion, another set of flow lines extending in a curved pattern from the surface of the boss and central bore to the end surface of the base, said base portion being significantly harder than the side wall portion.

2. The cartridge case of claim 1, wherein a majority of said another set of flow lines follow the contour of the walls of a primer cavity forged in the base portion.

3. The cartridge case of claim 2, wherein the diameter of the primer cavity is from about 1.0 to 1.5% smaller than the diameter of a brass primer to be swedged therein, thereby eliminating gas leaks from the case.

4. The cartridge case of claim 1, wherein the base portion is about 5% harder than the side wall portion.

5. The cartridge case of claim 1, wherein the base portion is no more than about 8% harder than the side wall portion.

6. The cartridge case of claim 4 wherein a majority of said another set of flow lines follow the contour of the walls of a primer cavity forged in the base portion.

7. The cartridge case of claim 1, wherein the volume of metal forming the boss is at least about equal to the volume of the central bore.

8. The cartridge case of claim 1, wherein the metal is an aluminum alloy comprising from about 0.9 to 2.2% by weight silicon.

9. The cartridge case of claim 7 wherein a majority of said another set of flow lines follow the contour of the walls of a primer cavity forged in the base portion.

10. The cartridge case of claim 7, wherein the aluminum alloy further comprises from about 0.6 to 1.5% by weight of magnesium which is present in the form of the intermetallic compound $Mg_2Si$.

11. The cartridge case of claim 8, wherein substantially all of the magnesium is present as the intermetallic compound $Mg_2Si$.

12. The cartridge case of claim 9, wherein the aluminum alloy contains $Mg_2Si$ in a precipitated crystalline form uniformly distributed in the alloy matrix.

13. The cartridge case of claim 8, wherein the aluminum alloy further comprises from about 0.9 to 2.1% by weight of copper.

14. The cartridge case of claim 11, wherein the aluminum alloy contains from about 1.5 to 4.2% by weight of the intermetallic compound $CuAl_2$.

15. The cartridge case of claim 1, wherein the metal is an aluminum alloy comprising, in percent by weight, about 1.5% silicon, 1.6% copper and 0.9% magnesium.

16. A metal cartridge case as defined by claim 1 wherein said aluminum was deep drawn to effect an elongation thereof to at least about 15% prior to being formed into a cartridge case.

17. A metal cartridge case as defined by claim 1 wherein said set of flow lines extending substantially parallel to the longitudinal axis of the case from the end portion and along the side wall portion is substantially straight throughout.

18. A metal cartridge case as defined by claim 16 wherein said set of flow lines extending parallel to the longitudinal axis of the case from the end portion and along the side wall portion is substantially straight throughout.

19. The cartridge case of claim 17 wherein a majority of said another set of flow lines follow the contour of the walls of a primer cavity forged in the base portion.

References Cited

UNITED STATES PATENTS

| 1,310,590 | 10/1924 | Fahrenwald | 102—43 |
| 2,349,970 | 5/1944 | Lambeck | 102—43 |
| 2,736,085 | 2/1956 | Parre et al. | 29—1.3 |
| 2,904,873 | 9/1959 | Hild | 102—43 X |

FOREIGN PATENTS

| 184,907 | 6/1936 | Switzerland. |
| 686,220 | 5/1964 | Canada. |
| 716,130 | 9/1954 | Great Britain. |

ROBERT F. STAHL, Primary Examiner

U.S. Cl. X.R.

29—1.3